United States Patent [19]

Leistner

[11] Patent Number: 4,679,975
[45] Date of Patent: Jul. 14, 1987

[54] NAIL STRIP WITH COVERED WIRE ATTACHING MEANS

[76] Inventor: Herbert E. Leistner, 167 Sweeney Drive, Toronto, Ontario, Canada

[21] Appl. No.: 857,184

[22] Filed: Apr. 29, 1986

[51] Int. Cl.$^4$ .............................................. F16B 15/08
[52] U.S. Cl. .................................... 411/443; 411/903; 411/908; 227/136; 206/343
[58] Field of Search ............... 411/442, 443, 444, 903, 411/908; 206/343, 345, 346; 227/136

[56]      References Cited
         U.S. PATENT DOCUMENTS

| | | | |
|---|---|---|---|
| 2,718,485 | 9/1955 | Samuely | 411/903 |
| 3,342,659 | 9/1967 | Baum et al. | 411/443 |
| 3,756,391 | 9/1973 | Keck et al. | 206/343 |
| 4,162,728 | 7/1979 | Uzumcu et al. | 206/345 |
| 4,343,579 | 8/1982 | Shelton et al. | 411/442 |

FOREIGN PATENT DOCUMENTS 677444 12/1964 Italy .................................... 411/442

Primary Examiner—Gary L. Smith
Assistant Examiner—Neill Wilson
Attorney, Agent, or Firm—George A. Rolston

[57] ABSTRACT

A nailing strip for use in a power-operating nailing hammer, and having a plurality of nails arranged in a strip, a junction wire fastened to the shank of each nail in the strip, and a sheath covering the wire.

7 Claims, 7 Drawing Figures

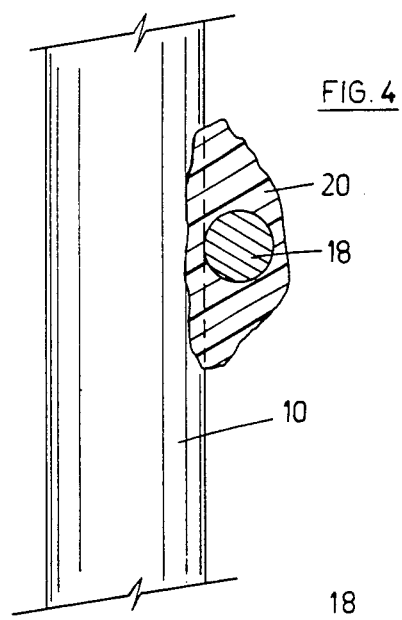
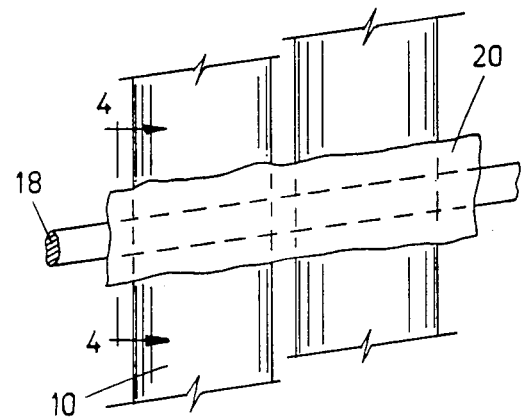
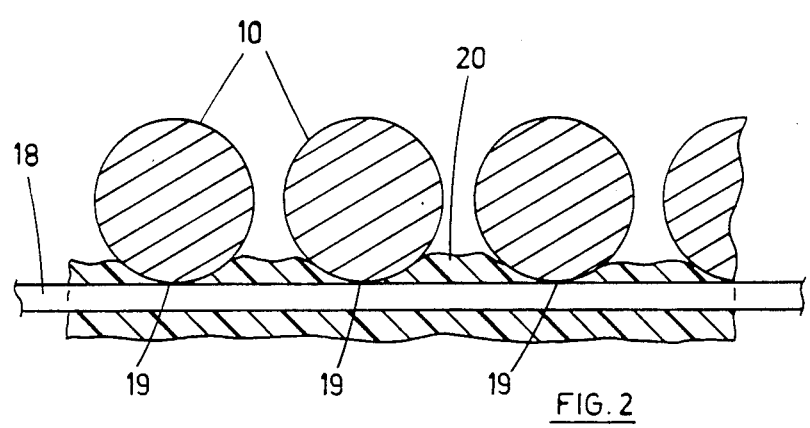

NAIL STRIP WITH COVERED WIRE ATTACHING MEANS

The invention relates to a nail strip for use in automatic nailing hammers.

BACKGROUND OF THE INVENTION

Power-operated nailing hammers are used extensively in industrial fastening of wooded objects, particularly in the manufacture of wooden pallets, and other wooden packaging and containers.

Typically, such power-operated nailing hammers are operated by electric power or by pneumatic means from a compressed air source. A plunger reciprocates to and fro in the hammer. Nails are formed into strips of considerable length and are fed to the plunger successively.

The nails may be formed into such strips in various ways. However, one of the most popular and widely used methods of forming nailing strips is to weld the nails to two lengths of thin breakable wire. Such wire nailing strips are popular because they are resistant to breakage and will withstand considerable abuse during shipping and handling.

In addition, they are popular because in the operation of the nailing hammer, the wires are actually broken between each nail.

When nails are held together by means other than lengths of wire, for example hot melt adhesive has been used, the adhesive tends to break up and accumulate inside the hammer and obstruct the free operation of the plunger.

This problem does not occur when using wire nailing strips.

However, the wire nailing strips do present other problems. As the nail is driven in by the plunger the wires may not always be cleanly cut or broken. There is a tendency for the wires to be ripped and distorted.

BRIEF SUMMARY OF THE INVENTION

With a view to overcoming the foregoing problems, the invention comprises a nailing strip for use in a power-operating nailing hammer, and having a plurality of nails arranged in a strip, at least one junction wire welded to each of said nails in said strip, and breakable sheath means covering said wire.

More particularly, the invention seeks to provide a nailing strip having the foregoing advantages wherein the wire is coated with thermo plastic material, after welding to the nails.

More particularly, the invention seeks to provide such a nailing strip wherein the wire is covered with a strip of a breakable material.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 2 is a section along 2—2 of FIG. 1;

FIG. 3 is greatly enlarged side elevation;

FIG. 4 is a section along line 4—4 of a FIG. 3;

DESCRIPTION OF A SPECIFIC EMBODIMENT

Figure 1:
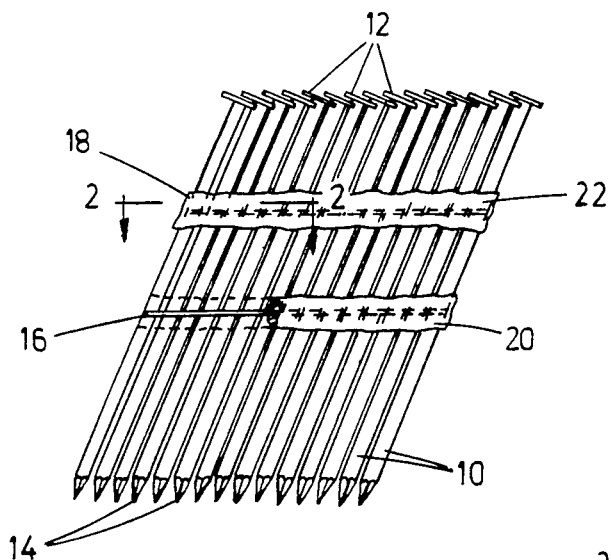
FIG. 1 is a side elevation of a nailing strip according to the invention showing the sheath partially removed to reveal the wire.

Referring to FIGS. 1 to 4, it will be seen that the embodiment of the invention which is illustrated for the purposes of explaining the invention, and without limitation, comprises a strip of nails, each of which is indicated as 10, having heads 12 and points 14. This strip of nails may be arranged in a variety of ways. For example, the nails can simply be arranged parallel and spaced apart side by side along an axis which is normal to the nails.

Alternatively, the nails can be arranged along an axis which is essentially diagonal to the axis of the nails so that the nail heads can overlap one another. In this way the nail shanks can lie closer together in the strip. The nail heads 12 may be completely round in some cases or may be Tee-shaped or may be semi-circular, or may have crescent-shaped cut-outs formed in them. The nails may be plain nails or may have specially formed frictional shanks with various forms of knurlings, or other frictional formations, depending upon the requirements of the end user.

In order to form the nails into a strip for use in a power-operated nailing hammer (not shown), the nails are all welded to two spaced-apart junction wires 16 and 18. The junction wires are arranged parallel with one another, and may extend normal to the axis of the nail shanks, or may make an oblique or diagonal angle, depending upon the arrangement of the nailing strip as described above.

The nails will be fastened to the wires by welds 19, and the wires may be cut at intervals so as to form nailing strips of a predetermined length, dependent upon the design of the nailing hammer in use by the customer.

In accordance with the invention, the wires 16 and 18 are covered with sheathing or sleeves 20 and 22.

In accordance with one form of the invention the sleeves 20 and 22 may comprise extruded thermoplastic material or hot-melt adhesive. The extrusion process can take place after the welding of the nails to the wires. This may result in a somewhat irregular shape of coating.

Thus the coating may appear as shown in FIGS. 2, 3 and 4. There will be no coating at all between the wire and the nail itself, since this is the location of the weld. The coating may be somewhat wider in the region of the nail, and narrower, on the portion of wire between the nails. Some coating will flow around the wire, completely enveloping it, between the nails. The coating strip is breakable, in the nailing gun itself.

Figure 5:
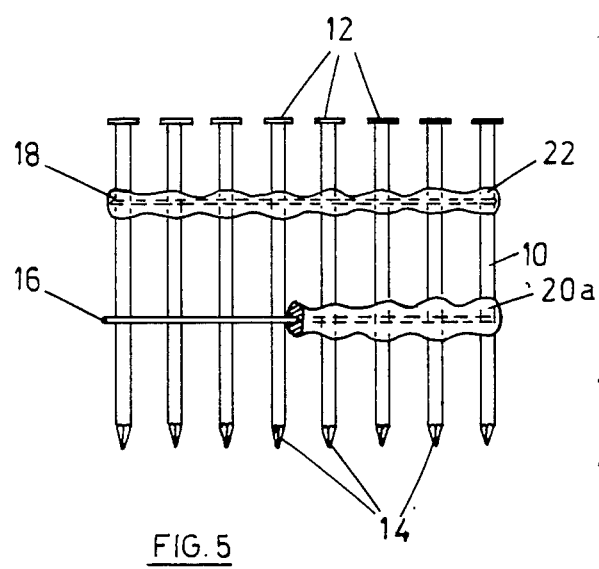
FIG. 5 is a perspective illustration of a different form of nailing strip.

As shown in FIG. 5, a nailing strip may be formed of nails 10 spaced further apart along the wires 16 and 18. This type of nailing strip is often used in greater lengths, coiled up in a circular magazine.

In this case, the application of the coating strip or sheath layer to the wires may result in a somewhat sinuous shape to the coating layer substantially as shown as 20A and 22A in FIG. 5.

Figure 6:
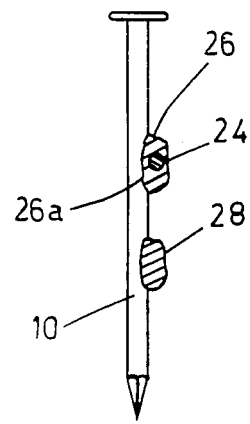
FIG. 6 is a section of an alternate embodiment.

In accordance with a further embodiment to the invention as shown in FIG. 6, the invention also makes it possible to dispense altogether with one of the wires 16 or 18.

In the embodiment shown in FIG. 6, a single wire 24 is shown welded to the shank of a nail 10. The wire 24 is shown enveloped in a sleeve or strip 26. The strip 26, which will typically be an extruded thermoplastic material or hot-melt adhesive, extends along a substantial length of the shank of each nail, and has flowed between the shanks of adjacent nails as at 26A so as to surround and envelope the wire 24.

A second strip 28, of plastic breakable material, typically extruded, or hot melt, or a strip product, is bonded to the nails 10, parallel to wire 24.

In this embodiment, the single wire 24 effectively joins the nails together and forms them into a nailing strip. The coating layer 26 both envelopes the wire 24. The second strip 28 between the nails will hold the nails in parallel spaced-apart location in the strip.

Thus the use of a second wire becomes unnecessary.

A significant advantage is obtained by simply eliminating one wire in that there is a 50% reduction in the requirement for cutting or breaking the wire cleanly.

Figure 7:
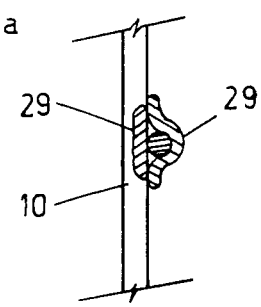
FIG. 7 is a section of a further alternate embodiment.

Alternatively other forms of coating may be applied such as strip thermoplastic 29 (FIG. 7) and other strip mouldable products, provided they are readily breakable.

Thus as illustrated, the coating is not to be taken as limited to thermoplastic, or any specific form of material. Rather, FIGS. 1 to 7 are illustrative of a coating layer as such, regardless of what material may be used to form it on the wires, and FIGS. 1 to 7 are to be considered as representing a coating layer or strip of whatever type of material may be suitable for the particular application.

It has been found to be the fact that by enveloping the wire, or wires, as the case may be, in one of the coating layers according to the invention, the wire is broken more cleanly in the nailing operation. As a result, the nailing operation is more reliable, and there is less tendency to cause misfeeds or jamming, and the nails are driven more cleanly into the workpiece.

The foregoing is a description of a preferred embodiment of the invention which is given here by way of example only. The invention is not to be taken as limited to any of the specific features as described, but comprehends all such variations, thereof as come within the scope of the appended claims.

What is claimed is:

1. A nailing strip for use in a power-operated nailing hammer of the type wherein the operation of said nailing hammer separates a nail from said strip, and drives said nail into a workpiece, and which nailing strip comprises:

a plurality of nails each having a cylindrical shaft and arranged in a strip with said shafts thereof disposed in mutually parallel and spaced apart disposition;

two mutually spaced apart and mutually parallel flexible junction wire means extending across said nailing strip and welded to the cylindrical shaft of each said nail in said strip; and, flexible and breakable sheath means covering and extending completely around each said wire means between adjacent ones of said nails and over an outer surface of each said junction wire means at each of said nails thereby to enhance the severing of said wire means during driving of a said nail from said strip.

2. a nailing strip for use in a power-operated nailing hammer of the type wherein the operation of said nailing hammer separates a nail from said strip, and drives said nail into a workpiece, and which nailing strip comprises:

a plurality of nails each having a cylindrical shaft and arranged in a strip with said shafts thereof disposed in mutually parallel and spaced apart disposition;

a flexible junction wire means extending across said nailing strip and welded to the cylindrical shaft of each said nail in said strip;

flexible and breakable sheath means covering and extending completely around said wire means between adjacent ones of said nails and over an outer surface of said junction wire means at each of said nails thereby to enhance the severing of said wire means during driving of a said nail from said strip; and a flexible and breakable non-metallic strip extending across said nailing strip in spaced apart and parallel relationship to said junction wire means and bonded to each of said nails.

3. A nailing strip for use in a power-operated nailing hammer of the type wherein the operation of said nailing hammer separates a nail from said strip, and drives said nail into a workpiece, and which nailing strip comprises:

a plurality of nails each having a cylindrical shaft and arranged in a strip with said shafts thereof disposed in mutually parallel and spaced apart disposition;

at least one flexible junction wire means extending across said nailing strip and fastened to the cylindrical shaft of each said nail in said strip; and, flexible and breakable sheath means covering and extending completely around said wire means between adjacent ones of said nails thereby to enhance the severing of said wire means during driving of a said nail from said strip.

4. A nailing strip as claimed in claim 3 wherein each of said nails is welded to said flexible junction wire means.

5. A nailing strip as claimed in claim 4 wherein said sheath means extending over an outer surface of said junction wire means at each of said nails.

6. A nailing strip as claimed in claim 3 wherein said junction wire means comprises a single junction wire extending across and welded to all said nails in said strip with a said sheath means enveloping said wire means between adjacent ones of said nails.

7. A nailing strip as claimed in claim 5 and which additionally comprises a flexible and breakable non-metallic strip extending across said nailing strip in spaced apart parallel relationship to said single junction wire and bonded to each of said nails.

* * * * *